United States Patent [19]

Jankewitz et al.

[11] Patent Number: 5,746,778
[45] Date of Patent: May 5, 1998

[54] WOOD STAIN CONTAINING A STABILIZING AGENT

[75] Inventors: Axel Jankewitz, Furth; Gerhard Lugert, Nürnberg, both of Germany

[73] Assignee: A.W. Faber-Castell Unternehmensverwaltung GmbH & Co., Germany

[21] Appl. No.: 652,309

[22] Filed: May 23, 1996

Related U.S. Application Data

[62] Division of Ser. No. 509,300, Jul. 31, 1995, Pat. No. 5,567,206.

[30] Foreign Application Priority Data

Aug. 2, 1994 [DE] Germany ............ 44 27 299.5

[51] Int. Cl.$^6$ ............ D06P 1/06; D06P 3/60; D06P 1/44
[52] U.S. Cl. ............ 8/402; 8/550; 8/602; 8/603; 8/618; 8/639; 8/641; 8/657; 8/658; 8/662; 8/682; 8/907
[58] Field of Search ............ 8/402, 550, 602, 8/603, 609, 618, 620, 657, 639, 662, 682, 687, 686, 907

[56] References Cited

U.S. PATENT DOCUMENTS

| | | | |
|---|---|---|---|
| 4,348,204 | 9/1982 | Bauer et al. | 8/527 |
| 4,715,969 | 12/1987 | Rothanavibhata et al. | 252/8.7 |
| 4,743,268 | 5/1988 | Dilling | 8/557 |
| 5,171,328 | 12/1992 | Trauth et al. | 8/402 |
| 5,536,761 | 7/1996 | Fujita | 523/160 |

FOREIGN PATENT DOCUMENTS

| | | |
|---|---|---|
| 3105642 | 8/1982 | Germany . |
| 4137851 | 5/1993 | Germany . |
| 42 37 063 | 5/1994 | Germany . |
| 54-126703 | 10/1979 | Japan . |
| 1 360 818 | 7/1974 | United Kingdom . |
| 91/02033 | 2/1991 | WIPO . |

OTHER PUBLICATIONS

Matsushita Electric Works, JP 57 123 010, Jul. 31, 1982, *Database WPI*, Section Ch, Week 8236, Derwent Publications, Abstract only.

Matsushita Electric Works, JP 62 173 205, Jul. 30, 1987, *Database WPI*, Section Ch, Week 8736, Derwent Publications, Ltd., Abstract only.

*Primary Examiner*—Douglas J. McGinty
*Assistant Examiner*—Caroline L. Dusheck
*Attorney, Agent, or Firm*—Spencer & Frank

[57] ABSTRACT

A wood stain which is water-based, which is suitable for staining wood, and which is comprised of water; at least one dye selected from the group consisting of azo, diazo and triarylmethane dyes; and a stabilizing agent which is effective to reduce free iron ion concentration in the stain when in contact with an autoclave composed of non-rust resistant steel during the staining process. The stabilizing agent includes at least one buffer effective to maintain the pH of the wood stain at greater than 7.0. Alternatively or additionally, the stabilizing agent includes at least one complexing agent which forms a complex with iron ions.

13 Claims, No Drawings

WOOD STAIN CONTAINING A STABILIZING AGENT

This is a division of application Ser. No. 08/509,300 filed Jul. 31, 1995, now U.S. Pat. No. 5,567,206.

CROSS-REFERENCE TO RELATED APPLICATION

The present disclosure relates to the subject matter disclosed in German Application No. P 44 27 299.5 filed Aug. 2, 1994, the entire specification of which is incorporated herein by reference.

BACKGROUND OF THE INVENTION

1. Field of The Invention

This invention relates to a water-based stain for staining wood containing at least one dye, such as azo, diazo and triarylmethane dyes, and to a method for staining wood. In particular, the present invention relates to use of a stabilizing agent which may be a buffer and/or a complexing agent and which is effective to reduce the concentration of free iron ions in the stain from contact with an autoclave composed of non-rust-resistant steel, and thereby reduce coloration impairment of the stain.

2. Background Of The Related Art

Wood stains are known, for example, from the furniture industry and are used for staining the surface of a piece of furniture while preserving its natural grain if possible. For this purpose, the surfaces of the pieces of furniture are treated with the stain by, for example, painting or spraying, and any other method know in the art. In such treatment processes the stain penetrates the wood surface only slightly. However, this is often not sufficient for achieving the desired staining of the wood surface. There are also cases where not only a surface staining of the wood is desired, but staining that penetrates deeper into or even entirely through the wood. The latter is the case in connection with the manufacture of lead pencils and colored pencils wherein the body of wood enclosing the lead of the pencil is intended to have a continuously uniform coloration. A further example of applications where penetrating staining of wood is desired is for wood blanks which are intended to be worked later, for example, by cutting or sawing, without the plain, unstained wood appearing at the worked places.

Such staining processes are usually performed in autoclaves. For this purpose, small pieces of wood, e.g., wood blanks in the form of small boards in the case of lead pencil or colored pencil manufacture, are placed into an autoclave and dipped into a colored stain. Then the autoclave is closed and the staining or penetrating staining is started by means of temperature and pressure increases as is well known in the art. Depending on the type of wood and the thickness of the wood blanks to be stained, penetrating staining can take several hours or even several days.

The dyes used can naturally be from a very broad spectrum of different dye types. However, as a rule two groups of dyes are used for staining wood, namely, acid dyes, which are also called anionic dyes, and basic or cationic dyes.

While no problems worth mentioning regarding the stability of the stains occur in connection with any of the mentioned dye groups in autoclaves of rust-resistant steel, for example, V2A steel, it was noted that the dyes were increasingly impaired during continued treatment when acid dyes were used in autoclaves made of normal, i.e., not anti-corrosive steel. The impairment consists in an increasing change in the color of the added dye.

The color change effect occurs in particular with azo- and diazo-dyes, but in a weakened form, also with triarylmethane dyes. It is known that acid dyes are used in a neutral to alkaline environment. At the end of the dying process the pH value of the stain typically has been lowered to a varying degree into the acid range, depending on the type of wood used. The reason for this is that organic acids are contained in the wood which cause an increase in the $H_3O+$ ion concentration. However, this effect cannot be or at least cannot be totally responsible for the observed color changes, since generally no color changes were observed in connection with autoclaves of special steel in spite of the lowering of the pH values.

Based on the above mentioned observation, it is the object of the present invention to reduce or eliminate the prior art color change effect by providing a stain and a staining method for wood which can be used in autoclaves made of non-rust-resistant steel and while using azo, diazo and triarylmethane dyes.

SUMMARY OF THE INVENTION

This object is attained by the present invention which provides a wood stain which is water-based and which is suitable for staining wood, comprising: water; at least one dye selected from the group consisting of azo, diazo and triarylmethane dyes; and a stabilizing agent which is effective to reduce free iron ion concentration. The wood stain has a pH and the stabilizing agent comprises at least one buffer effective to maintain the pH of the wood stain at greater than 7.0. The at least one buffer may be at least one inorganic salt which is water-soluble. The stabilizing agent may alternatively or additionally comprise at least one complexing agent which forms a complex with iron ions. The wood stain may additionally comprise at least one auxiliary agent selected from the group consisting of wetting agents, water-soluble wax dispersions, water-soluble fatty acid derivatives, and preserving agents.

The present invention additionally provides a method for staining wood, comprising: placing the wood into an autoclave composed of non-rust-resistant steel; submerging the wood in a wood stain according to the invention; and staining the wood under pressure and temperature conditions effective therefor.

The present invention additionally contemplates reducing coloration impairment of dyes contained in wood stain during staining of wood in an autoclave composed of non-rust-resistant steel, the wood stain being comprised of water and at least one dye selected from the group consisting of azo, diazo and triarylmethane dyes, by incorporating into the wood stain a stabilizing agent according to the invention which is effective to reduce free iron ion concentration in the wood stain when in contact with the autoclave.

Thus, the stain of the invention contains a stabilizer which reduces the amount of iron from the autoclave which would otherwise solubilize as iron ions into the stain. It was surprisingly shown that, by means of this, the previously observed color changes no longer occur or occur only after considerably longer treatment periods. The concentration of the iron ions which move into the dye solution is reduced or kept small by the stabilization agent added in accordance with the invention and, therefore, the effect on the chromophoric groups of the dyes is reduced. The effect of the iron ions on the dye can be interpreted in such a way that the iron ions cooperate with the $\pi$-electron systems of the dye as does a Lewis acid and, in the process, changes its light adsorption properties. It therefore appears that the concentration of free iron ions plays a decisive role in the generation of the color change effect. In the neutral or alkaline environment usually present in the mentioned dye-containing stains these would overwhelmingly be Fe-III-ions.

In principle, there are two ways available to reduce the iron ion concentration or to prevent creation of a concentration of iron ions which affects the chromophoric group of the dyes.

The stabilizing agent may be a buffer substance which maintains the pH value of the stain at a level which is greater than 7.0. Then, little or no concentration of Fe-II and Fe-III ions can even be created in this pH range, since the iron ions are precipitated as iron hydroxide. The buffer, which preferably is a water-soluble inorganic salt, counteracts a lowering of the pH by organic acids present in the wood. Substances are advantageously employed as buffers which neither enter into an interaction with the wood to be dyed nor with the dye employed. Buffer substances such as acetates and carbonates of ammonium, potassium and sodium, as well as ammonium hydrogen phosphate, secondary and tertiary phosphates of potassium and sodium or ammonium sodium hydrogen phosphate should be mentioned here by way of example but not limitation. However, organic buffer substances can also be used, for example, sodium acetate.

The iron ions can also be made innocuous in that they may be masked with the aid of a complexing agent. The formation of a concentration of iron ions per se is not prevented by this, but they are no longer free ions, i.e., they are captured by the ligands of the complex-forming substance and are therefore shielded so to speak. Thus, their property as a Lewis acid in respect to the $\pi$ electrons of the dye cannot be brought to bear. The following substances may be used as complexing agents and are given by way of example but not limitation: diacetyldioxime, 1,10-phenanthroline, terpyridine and water-soluble salts of ethylene-diaminetetraacetic acid, diethylenetriamine pentaacetic acid or 1,2-cyclohexylinedinitrilotetraacetic acid.

The stabilizing agent can also contain a buffer substance, as well as a complexing agent. It has been surprisingly shown that a stabilization of the stain, which exceeds the extent of the effects of the individual substances, was achieved by the simultaneous presence of a buffer and a complexing agent as will be discussed further in the following.

The stain in accordance with the invention can additionally contain the usual additives employed with such stains as is known in the staining art, such as wetting agents, water-soluble wax dispersions, fatty acid derivatives, and preserving agents, without interference with the effect in accordance with the invention. The addition of preserving agents, such as fungicides, is indicated, for example, if stained wood blanks are intended to be stored over extended periods of time under humid conditions, such as in the tropics. It is mainly their job to prevent the wood blanks from being affected by fungi. Water-soluble wax dispersions or water-soluble fatty acid derivatives are added, for example, if it is intended to produce pencils. The mentioned substances are deposited in the hollow or capillary spaces of the wood and make it possible to easily sharpen the pencil made therefrom in that the chips cut from the tip cone of the pencil do not break easily and crumble. The surface tension of the main constituent of the stain, water, is reduced by the addition of a wetting agent. The penetration ability of the stain into the capillary system of the wood is increased thereby.

A composition of the wood stain in accordance with the invention, in weight-%, comprises from about 1 to about 20% of at least one dye; from about 0.01 to about 5% of at least one wetting agent; from about 0.1 to about 0.5% of at least one preserving agent; from about 1 to about 20% of a stabilizing agent, and remainder water. Advantageous formulations for stains in accordance with the invention are given herein in the Examples which follow.

DESCRIPTION OF THE PREFERRED EMBODIMENTS

The invention will now be explained in detail by means of exemplary embodiments.

A laboratory autoclave with a capacity of approximately 5 liters was used for preparing the following exemplary formulations. The autoclave was made of ordinary steel, i.e., non-rust-resistant steel. Contact of the stain with the mentioned material was always the case. A volume of approximately 2 liters of wood in the form of small boards, such as are used in cosmetic, lead or colored pencil manufacture, was placed into the autoclave. The autoclave was filled with stain at least sufficiently for the wood pieces to be completely covered by the stain. The temperature in all cases was 50° C. to 60° C. The pH value fell to a level of between 8 and 10. Furthermore, pressure values between 13 and 15 bar were maintained.

The tests were performed in such a way that, respectively, at the end of a staining pass of approximately 24 hours, the test pieces were taken out and the coloration of the pieces and/or of the rest of the stain remaining in the autoclave was checked. Then fresh, i.e., unstained pieces were inserted and the stain used up in the previous staining process was replenished.

The percentages cited in the formulations below relate to weight-%. The dyes tested are identified as follows:

C.I. 19140 is $C_{16}H_9N_4O_9S_2Na_3$ which is the trisodium salt of 5-hydrox-1-(4-sulfonatophenyl)-4-(4-sulfonatophenylazo)- pyrazole-3-carboxylic acid.

C.I. 16255 is $C_{20}H_{11}N_2O_{10}S_3Na_3$ which is the trisodium salt of 7-hydroxy-8-(4-sulfonato-1-naphthylazo)-napthaline-1,3-disulfonic acid.

C.I. 42090 is $C_{37}H_{34}N_2O_9S_3Na_2$ which is the disodium salt of α-{4-(N-ethyl-3-sulfonatobenzylamino)phenyl}-α-{4-(N-ethyl-3-sulfonatobenzylimino)-cyclohexa-2,5-dienylidene}-toluene-2-sulfenic acid.

C.I. 42051 is $(C_{27}H_{31}N_2O_7S_2)CA$ or $C_{27}H_{31}N_2O_7S_2Na$ which is either the calcium salt or the sodium salt of 2,4-disulfo-5-hydroxy-4', 4"-bis-(diethylamino)-triphenyl-carbinolanhydride.

C.I. 28840 is $C_{28}H_{27}N_5O_{14}S_4Na_4$ which is the tetrasodium salt of 4-acetamido-5-hydroxy-6-{7-sulfonato-4-(4-sulfonatophenylazo)-1-naphthylazo}naphtalene-1,7-disulfonic acid.

| Reference Example without Stabilizing Agent (Black Stain): | |
|---|---|
| Acid Yellow 23 C.I. 19140 | 0.8%, |
| Acid Red 18 C.I. 16255 | 2.8%, |
| Acid Blue 9 C.I. 42090 | 1.4%, |
| Polyoxyethylene- (20) -sorbitan-monolaurate | 0.8%, |
| Mixture of chloroacetamide/sodium benzoate and the remainder water. | 0.2%, |

Two different types of wood were stained, namely jelutong wood and wood of the California cedar. The volume of the respective wood type was approximately 1 liter. As a result it was noted that following the first staining pass the black coloration of the stain already showed a slightly greenish cast. A second staining process was then performed after the previously used up stain had been replenished. Following the second staining pass the black stain showed a distinct green coloration.

This test result shows that conventional stains are not practical for use in autoclaves of normal, non-rust-resistant steel, because only a single staining process can be performed. The stain is already damaged in the first treatment phase extending over 24 hours to such an extent that it is no longer usable for a second staining process. For performing wood staining on an industrial scale this means that a continuous operation, wherein a large stain volume remains in the autoclave during several staining processes and only fresh batches of wood are placed in the autoclave and used up stain is replenished, is not possible.

EXAMPLE 1

(Black Stain)

| Acid Yellow 23 C.I. 19140 | 0.8%, |
|---|---|
| Acid Red 18 C.I. 16255 | 2.8%, |
| Acid Blue 9 C.I. 42090 | 1.4%, |
| Polyoxyethylene- (20) -sorbitan-monolaurate | 0.8%, |
| Mixture of chloroacetamide/sodium benzoate | 0.2%, |
| Sodium carbonate | 2.5%, |
| and the remainder water. | |

It was possible to perform between three and four staining operations with the stain without the degree of blackening of the stain or the wood stained with it having changed. A color shift in the direction toward green was observed only after further staining passes and, in the further course of continuing the test, a color change in the direction of blue-green.

The two dyes used in the above two tests, acid red 18 and acid yellow 23, as well as in the following ones, are azo dyes, while acid blue 9 is a triarylmethane dye. These dyes belong to the group of acid or anionic dyes. As far as the effect on the color or the chromophorous groups of the dyes by the iron ions entering the dye solution from the autoclave is concerned, the test result in accordance with Example 1 can be interpreted as follows: the azo dyes, i.e., acid yellow 23 and especially acid red 18, are the most sensitive. They are impaired first. Thus, the red tones of the dye mixture are weakened first. The relative proportion of the blue and yellow dye accordingly increases, which results in the observed green coloration. With an increasing length of the test, the yellow dye is also impaired which results in a shift of the coloration in the direction toward blue. Thus, the triarylmethane dye acid blue 9 is the most stable. However, it is also attacked if the test is continued and is discolored in the end.

It can be clearly observed from a comparison between the Reference Example and Example 1 that a considerable extension of the staining time can be achieved by the addition of a buffer, in the present example, Example 1, sodium chloride. A complete refill of an autoclave with fresh stain need only be performed after three to four staining processes. If it is taken into consideration that, in operations on an industrial scale, considerably greater amounts of stain are used, the advantage of the stain in accordance with the invention and of the method in accordance with the invention over conventional staining processes becomes clear. The savings of time and material are evident.

EXAMPLE 2

(Black Stain)

| Acid yellow 23 C.I. 19140 | 0.8%, |
|---|---|
| Acid Red 18 C.I. 16255 | 2.8%, |
| Acid Blue 9 C.I. 42090 | 1.4%, |
| Polyoxyethylene- (20) -sorbitan-monolaurate | 0.8%, |
| Mixture of chloroacetamide/sodium benzoate | 0.2%, |
| Ethylenediaminetetraacetic acid tetrasodium salt | 3.0%, |
| and the remainder water. | |

In this example, a complexing agent, namely, ethylenediaminetetraacetic acid tetrasodium salt, was used as a stabilizing agent instead of a buffer. The black stain in accordance with Example 2 went through four staining passes without a color change. A shift of the color tone toward blue-green was noted only after the fifth staining operation. Here, too, the least stable dye, acid red 18, was first impaired.

EXAMPLE 3

(Black Stain)

| Acid Blue 9 C.I. 42090 | 1.4%, |
|---|---|
| Acid Red 18 C.I. 16255 | 2.8%, |
| Acid Yellow 23 C.I. 19140 | 0.8%, |
| Polyoxyethylene- (20) -sorbitan-monolaurate | 0.8%, |
| Mixture of chloroacetamide/sodium benzoate | 0.2%, |
| Sodium acetate | 3.0%, |
| Ethylenediaminetetraacetic acid tetrasodium salt | 3.0%, |
| and the remainder water. | |

This stain maintained its color consistency over at least five staining operations. Only after further staining operations could a color shift in the green direction (discoloration of the red dye) and, in the further course of the test, a coloration in the direction toward blue (discoloration of the yellow dye) be observed.

If the results of this test are compared with those of Example 1 and Example 2 it becomes clear that a further improvement in the stability of the stain can be achieved by the presence of a buffer, as well as a complexing agent. While, with sodium carbonate as the sole stabilizing agent, a color constancy over three to four staining operations was achieved and while, with ethylenediaminetetraacetic acid tetrasodium salt as a sole stabilizing agent, a color constancy over four staining operations, the color constancy of a stain wherein the buffer and the complexing agent are simultaneously present is further improved. This is shown by the fact that, in the test in accordance with Example 3, a color constancy over at least five staining operations was observed. Obviously, the buffer and the complexing agent complement each other in a synergistic way.

In a control test, sodium acetate (buffer) and ethylenediaminetetraacetic acid tetrasodium salt (complexing agent) were omitted. Discoloration in the green direction was already observed after only one staining operation.

EXAMPLE 4

(Green Stain)

| | |
|---|---|
| Acid Blue 9 C.I. 42051 | 1.0%, |
| Acid Yellow 23 C.I. 19140 | 4.0%, |
| Polyoxyethylene- (20) -sorbitan-monolaurate | 2.5%, |
| Polyglycolether | 2.0%, |
| Paraben mixture | 0.3%, |
| Dipotassium hydrogen phosphate | 2.0%, |
| Ethylenediaminetetraacetic acid tetrasodium salt | 4.0%, |
| and the remainder water. | |

Poplar and jelutong wood was dyed in this test. The green color of the stain was preserved without change over at least six staining passes. In a comparative test, the stabilizing agents were omitted with the result that a discoloration toward blue could already be observed after one staining pass. The synergistic effect of the simultaneous presence of a buffer and a complexing agent became clear from this test result also.

EXAMPLE 5

(Dark Grey Stain)

| | |
|---|---|
| Food Black 1 C.I. 28440 | 0.5%, |
| Acid Yellow 23 C.I. 19140 | 0.4%, |
| Acid Red 18 C.I. 16255 | 1.4%, |
| Acid Blue 9 C.I. 42090 | 0.7%, |
| Polyoxyethylene- (20) -sorbitan-monolaurate | 0.5%, |
| Paraben mixture | 0.3%, |
| Sodium stearate | 3.0%, |
| Ammonium carbonate | 2.0%, |
| 1,2--cyclohexylinedinitrilotetraacetic acid disodium salt | 6.0%, |
| and the remainder water. | |

The food black 1 dye is a diazo dye. A mixture of ammonium carbonate (buffer) and 1,2-cyclohexylinedinitrilotetraacetic acid disodium salt (complexing agent) was added to the stain as a stabilizing agent. From the result it could be determined that the dark grey color of the stain remained stable over at least four staining operations. A comparison test without stabilizing agents showed that a discoloration in the direction toward green had appeared after only one staining pass which, with an increasing number of staining operations, was displaced more and more toward blue. That only four stain operations could be achieved in this example in spite of the presence of a buffer and a complexing agent (in Example 3 at least five staining operations, in Example 4 at least six staining operations) could perhaps be explained by the fact that the food black 1 C.I. 28440 diazo dye has an even lesser stability with respect to iron ions than acid red 18 C.I. 16255.

EXAMPLE 6

(Orange-colored Stain):

| | |
|---|---|
| Acid Red 18 C.I. 16255 | 3.6%, |
| Acid Yellow 23 C.I. 19140 | 1.4%, |
| Polyoxyethylene- (20) -sorbitan-monolaurate | 0.1%, |
| Chloroacetamide/sodium benzoate mixture | 0.2%, |
| Sodium acetate | 3.0%, |
| Diacetyldioxime | 4.0%, |
| and the remainder water. | |

This orange-colored stain retained its color constancy over at least five staining operations. Only after further staining operations was a color shift in the direction toward yellow observed and, during the further course of the test, a discoloration of the yellow dye too was observed. The synergistic effect of the simultaneous presence of the complexing agent and the buffer is noticeable here also.

In conclusion it should be noted that color impairment was observed also with other than the above mentioned dye groups if the staining process was performed in autoclaves made of non-rust-resistant steel. It can therefore be assumed with some justification that impairment of these additional dyes was also a result of the presence of free iron ions.

It should be possible to transfer the principle on which the instant invention is based, namely, the reduction of the iron ion concentration by means of buffers and/or complexing agents, in general to dyes of all types which are impaired in their coloration by contact with the surface of an autoclave made of non-rust-resistant steel.

It is understood that various other modifications will be apparent to, and can be readily made by, those skilled in the art without departing from the scope and spirit of the present invention. Accordingly, it is not intended that the scope of the claims appended hereto be limited to the description set forth above but, rather, that the claims be construed as encompassing all of the features of patentable novelty which reside in the present invention including all features which would be treated as equivalents thereof by those skilled in the art to which the invention pertains.

What is claimed is:

1. A wood stain which is water-based and which is suitable for staining wood, comprising:

from about 1–20% of at least one dye substance selected from the group consisting of azo, diazo, and triarylmethane dyes and mixtures thereof;

from about 0.01 to about 5% of at least one wetting agent;

from about 0.1% to about 0.5% of at least one preserving agent; and from about 1 to about 20% of a stabilizing agent which is effective to reduce free iron ion concentration, which comprises one of (a) at least one buffer effective to maintain pH of the wood stain at greater than 7, (b) at least one complexing agent which forms a complex with iron ions, or (c) a mixture of the at least one buffer and the at least one complexing agent; and remainder water, wherein the buffer is selected from the group consisting of acetates and carbonates of ammonium, potassium and sodium; ammonium hydrogen phosphate; secondary and tertiary phosphates of potassium and sodium; and ammonium sodium hydrogen phosphate, and wherein the complexing agent is selected from the group consisting of diacetyldioxime; 1,10- phenanthroline; terpyridine; water-soluble salts of ethylene-diamine-tetraacetic acid; diethylenetriamine pentaacetic acid; 1,2-cyclohexylinedinitrilotetraacetic acid, and mixtures thereof.

2. The wood stain in accordance with claim 1, wherein the wood stain has a pH, and wherein the stabilizing agent comprises a mixture of the at least one buffer effective to maintain the pH of the wood stain at greater than 7.0 and the at least one complexing agent which forms a complex with iron ions.

3. The wood stain in accordance with claim 1, further comprising at least one auxiliary agent selected from the group consisting of water-soluble wax dispersions and water-soluble fatty acid derivatives.

4. A wood stain which is water-based, which is suitable for staining wood, and which has a composition in weight-%, comprising:

0.8% of Acid Yellow 23 C.I. 19140;

2.8% of Acid Red 18 C.I. 16255; and 1.4% of Acid Blue 9 C.I. 42090 as dye substance;

0.8% of a wetting agent comprised of polyoxyethylene-(20)-sorbitan-monolaurate;

0.2% of a preservative comprised of a mixture of chloroacetamide and sodium benzoate;

2.5% of a stabilizing agent comprised of sodium carbonate; and remainder water.

5. A wood stain which is water-based, which is suitable for staining wood, and which has a composition in weight-%, comprising:

0.8% of Acid Yellow 23 C.I. 19140;

2.8% of Acid Red 18 C.I. 16255; and 1.4% of Acid Blue 9 C.I. 42090 as dye substance;

0.8% of a wetting agent comprised of polyoxyethylene-(20)-sorbitan-monolaurate;

0.2% of preservative comprised of a mixture of chloroacetamide and sodium benzoate;

3.0% of complexing agent comprised of ethylenediaminetetraacetic acid tetrasodium salt; and remainder water.

6. A wood stain which is water-based, which is suitable for staining wood, and which has a composition in weight-% comprising:

3.6% of Acid Red 18 C.I. 16255; and 1.4% of Acid Yellow 23 C.I. 19140 as dye substance;

0.1% of wetting agent comprised of polyoxyethylene-(20)-sorbitan-monolaurate;

0.2% of preservative comprised of a mixture of chloroacetamide and sodium benzoate;

3.0% of stabilizing agent comprised of sodium acetate;

4.0% of complexing agent comprised of diacetyldioxime; and remainder water.

7. A wood stain which is water-based, which is suitable for staining wood, and which has a composition in weight-%, comprising:

1.0% of Acid Blue 9 C.I. 42051; and 4.0% of Acid Yellow 23 C.I. 19140 as dye substance;

2.5% of wetting agent comprised of polyoxyethylene-(20)-sorbitan-monolaurate;

2.0% of polyglycolether;

0.3% of preservative comprised of paraben mixture;

2.0% of stabilizing agent comprised of dipotassium hydrogen phosphate;

4.0% of complexing agent comprised of ethylenediaminetetraacetic acid tetrasodium salt; and remainder water.

8. A wood stain which is water-based, which is suitable for staining wood, and which has a composition in weight-%, comprising:

0.5% of Food Black 1 C.I. 28440;

0.4% of Acid Yellow 23 C.I. 19140;

1.4% of Acid Red 18 C.I. 16255; and 0.7% of Acid Blue 9 C.I. 42090 as dye substance;

0.5% of wetting agent comprised of polyoxyethylene-(20)-sorbitan-monolaurate;

0.3% of preservative comprised of paraben mixture;

3.0% of sodium stearate;

2.0% of stabilizing agent comprised of ammonium carbonate;

6.0% of complexing agent comprised of 1,2-cyclohexylinedinitrilotetraacetic acid disodium salt; and remainder water.

9. A wood stain which is water-based and which is suitable for staining wood, comprising:

from about 1–20% of at least one dye substance selected from the group consisting of Acid Yellow 23 C.I. 19140, Acid Red 18 C.I.16255, Acid Blue 9 C.I. 42090, and mixtures thereof;

from about 0.01 to about 5% of at least one wetting agent;

from about 0.1% to about 0.5% of at least one preserving agent; and from about 1 to about 20% of a stabilizing agent which is effective to reduce free iron ion concentration, which comprises one of (a) at least one buffer effective to maintain the pH of the wood stain at greater than 7, (b) at least one complexing agent which forms a complex with iron ions, or (c) a mixture of the at least one buffer and the at least one complexing agent; and remainder water, wherein the buffer is selected from the group consisting of acetates and carbonates of ammonium, potassium and sodium; ammonium hydrogen phosphate; secondary and tertiary phosphates of potassium and sodium; and ammonium sodium hydrogen phosphate, and wherein the complexing agent is selected from the group consisting of diacetyldioxime; 1,10- phenanthroline; terpyridine; water-soluble salts of ethylene-diaminetetraacetic acid; diethylenetriamine pentaacetic acid; 1,2-cyclohexylinedinitrilotetraacetic acid, and mixtures thereof.

10. The wood stain in accordance with claim 9, wherein the wood stain has a pH, and wherein the stabilizing agent comprises at least one buffer effective to maintain the Ph of the wood stain at greater than 7.0.

11. The wood stain in accordance with claim 9, wherein the stabilizing agent comprises at least one complexing agent which forms a complex with iron ions.

12. The wood stain in accordance with claim 9, wherein the wood stain has a pH, and wherein the stabilizing agent comprises at least one buffer effective to maintain the Ph of the wood stain at greater than 7.0 and at least one complexing agent which forms a complex with iron ions.

13. The wood stain in accordance with claim 9, further comprising at least one auxiliary agent selected from the group consisting of water-soluble wax dispersions and water-soluble fatty acid derivatives.

* * * * *